(12) United States Patent
Barkan et al.

(10) Patent No.: US 12,423,381 B2
(45) Date of Patent: Sep. 23, 2025

(54) MODEL WITH USAGE DATA COMPENSATION

(71) Applicant: Microsoft Technology Licensing, LLC, Redmond, WA (US)

(72) Inventors: Oren Barkan, Tel-Aviv (IL); Roy Hirsch, Tel Aviv (IL); Ori Katz, Tel-Aviv (IL); Avi Caciularu, Tel-Aviv (IL); Yonathan Weill, Tel-Aviv (IL); Noam Koenigstein, Tel Aviv (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 705 days.

(21) Appl. No.: 17/543,065

(22) Filed: Dec. 6, 2021

(65) Prior Publication Data

US 2023/0177111 A1    Jun. 8, 2023

(51) Int. Cl.
*G06F 18/2115* (2023.01)
*G06F 18/21* (2023.01)
(Continued)

(52) U.S. Cl.
CPC ...... *G06F 18/2115* (2023.01); *G06F 18/2148* (2023.01); *G06F 18/217* (2023.01); *G06N 20/00* (2019.01)

(58) Field of Classification Search
CPC ............. G06F 18/2115; G06F 18/2148; G06F 18/217; G06N 20/00; G06N 3/048;
(Continued)

(56) References Cited

U.S. PATENT DOCUMENTS 10,945,012 B2    3/2021  Schneck et al.
2014/0181121 A1   6/2014  Nice et al.
(Continued)

FOREIGN PATENT DOCUMENTS

| CN | 111310028 A | 6/2020 | |
| CN | 112632397 A | 4/2021 | |
| WO | WO-2019022840 A1 * | 1/2019 | ........... G06F 17/279 |

OTHER PUBLICATIONS

"Cold Start Revisited: A Deep Hybrid Recommender with Cold-Warm Item Harmonization", In Proceedings of IEEE International Conference on Acoustics, Speech and Signal Processing {ICASSP), Jun. 6, 2021, pp. 3260-3264.) (Year: 2021).*

(Continued)

*Primary Examiner* — Nay A Maung
*Assistant Examiner* — Dustin Bilodeau
(74) *Attorney, Agent, or Firm* — Holzer Patel Drennan

(57) ABSTRACT

A method of training a machine learning model is provided. The method includes receiving labeled training data in the machine learning model, the received labeled training data including content data for items accessible to a user and input usage data representing recorded interaction between the user and the items, wherein the received content data for each item includes data representing intrinsic attributes of the item. The method further includes selecting a set of the input usage data that excludes input usage data for a proper subset of the items and training the machine learning model based on both the content data and the selected set of input usage data of the received labeled training data for the items.

20 Claims, 7 Drawing Sheets

(51) Int. Cl.
G06F 18/214 (2023.01)
G06N 20/00 (2019.01)

(58) Field of Classification Search
CPC .......... G06N 3/047; G06N 3/084; G06N 3/09; G06Q 30/0202; G06Q 30/0241; G06Q 30/0631
See application file for complete search history.

(56) References Cited

U.S. PATENT DOCUMENTS

| | | |
|---|---|---|
| 2018/0218428 A1 | 8/2018 | Xie et al. |
| 2019/0043493 A1 | 2/2019 | Mohajer et al. |
| 2021/0004021 A1* | 1/2021 | Zhang ........................ G06T 7/74 |
| 2021/0165848 A1 | 6/2021 | Sror et al. |
| 2021/0201208 A1* | 7/2021 | Bhole ................... G06F 18/214 |
| 2022/0172426 A1* | 6/2022 | Lissi ....................... G06T 19/00 |
| 2022/0180186 A1* | 6/2022 | Basilico ................... G06N 3/08 |

OTHER PUBLICATIONS

Barkan, et al., "Cold Start Revisited: A Deep Hybrid Recommender with Cold-Warm Item Harmonization", In Proceedings of IEEE International Conference on Acoustics, Speech and Signal Processing (ICASSP), Jun. 6, 2021, pp. 3260-3264.

"International Search Report and Written Opinion Issued in PCT Application No. PCT/US22/044307", Mailed Date: Jan. 5, 2023, 16 Pages.

Duricic, et al., "Trust-Based Collaborative Filtering: Tackling the Cold Start Problem Using Regular Equivalence", In Proceedings of the 12th ACM Conference on Recommender Systems, Oct. 2, 2018, pp. 446-450.

Barkan, et al., "CB2CF: A Neural Multiview Content-to-Collaborative Filtering Model for Completely Cold Item Recommendations", In Proceedings of the 13th ACM Conference on Recommender System, Sep. 16, 2019, pp. 228-236.

Bennett, et al., "The Netflix Prize", In Proceedings of KDD Cup and Workshop, vol. 2007, Aug. 12, 2007, 4 Pages.

Blei, et al., "Latent Dirichlet Allocation", In Journal of Machine Learning Research, vol. 3, Mar. 1, 2003, pp. 993-1022.

Braunhofer, Matthias, "Hybridisation Techniques for Cold-Starting Context-Aware Recommender Systems", In Proceedings of the 8th ACM Conference on Recommender Systems, Oct. 6, 2014, pp. 405-408.

Burke, Robin, "Hybrid Recommender Systems: Survey and Experiments", In Journal of User Modeling and User-Adapted Interaction, vol. 12, Issue 4, Nov. 2002, pp. 331-370.

Barkan, et al., "Item2vec: Neural Item Embedding for Collaborative Filtering", In Proceedings of the IEEE 26th International Workshop on Machine Learning for Signal Processing, Sep. 13, 2016, 6 Pages.

Dacrema, et al., "Are We Really Making Much Progress? A Worrying Analysis of Recent Neural Recommendation Approaches", In Proceedings of the 13th ACM Conference on Recommender Systems, Sep. 16, 2019, pp. 101-109.

Day, George S., "The Product Life Cycle: Analysis and Applications Issues", In Journal of Marketing, vol. 45, Issue 4, Sep. 1, 1981, pp. 60-67.

Deldjoo, et al., "Using Visual Features Based on MPEG-7 and Deep Learning for Movie Recommendation", In International Journal of Multimedia Information Retrieval, vol. 7, Issue 4, Jun. 14, 2018, 13 Pages.

Devlin, et al., "BERT: Pretraining of Deep Bidirectional Transformers for Language Understanding", In Proceedings of the Conference of the North American Chapter of the Association for Computational Linguistics: Human Language Technologies, vol. 1, Jun. 2, 2019, pp. 4171-4186.

Devlin, et al., "BERT: Pre-training of Deep Bidirectional Transformers for Language Understanding", In Repository of arXiv:1810.04805v1, Oct. 11, 2018, 14 Pages.

Dror, et al., "The Yahoo! Music Dataset and KDD-Cup'11", In Proceedings of KDD Cup of Machine Learning Research, vol. 18, Jun. 2012, pp. 3-18.

"IMDb", Retrieved from: https://web.archive.org/web/20211112182844/https://www.imdb.com/, Nov. 12, 2021, 5 Pages.

Frolov, et al., "HybridSVD: When Collaborative Information is Not Enough", In Proceedings of the 13th ACM Conference on Recommender Systems, Sep. 16, 2019, pp. 331-339.

Harper, et al., "The MovieLens Datasets: History and Context", In Journal of ACM Transactions on Interactive Intelligent Systems, vol. 5, Issue 4, Article 19, Dec. 22, 2015, 19 Pages.

He, et al., "Deep Residual Learning for Image Recognition", In Proceedings of the IEEE Conference on Computer Vision and Pattern Recognition, Jun. 27, 2016, pp. 770-778.

He, et al., "Neural Collaborative Filtering", In Proceedings of the 26th International Conference on World Wide Web, Apr. 3, 2017, pp. 173-182.

Kingma, et al., "Adam: A Method for Stochastic Optimization", In Repository of arXiv:1412.6980v1, Dec. 22, 2014, 9 Pages.

Koren, et al., "Matrix Factorization Techniques for Recommender Systems", In Journal of Computer, vol. 42, Issue 8, Aug. 7, 2009, pp. 30-37.

Lam, et al., "Addressing Cold-Start Problem in Recommendation Systems", In Proceedings of the 2nd International Conference on Ubiquitous Information Management and Communication, Jan. 31, 2008, pp. 208-211.

Lee, et al., "MeLU: Meta-Learned User Preference Estimator for Cold-Start Recommendation", In Repository of arXiv:1908.00413v1, Aug. 4, 2019, 10 Pages.

Li, et al., "Collaborative Variational Autoencoder for Recommender Systems", In Proceedings of the 23rd ACM SIGKDD International Conference on Knowledge Discovery and Data Mining, Aug. 13, 2017, pp. 305-314.

Çano, et al., "Hybrid Recommender Systems: A Systematic Literature Review", In Journal of Intelligent Data Analysis, vol. 21, Issue 6, Nov. 15, 2017, 38 Pages.

Malkiel, et al., "RecoBERT: A Catalog Language Model for Text-Based Recommendations", In Repository of arXiv:2009.13292v1, Sep. 25, 2020, 12 Pages.

Oord, et al., "Deep Content-Based Music Recommendation", In Proceedings of the 26th International Conference on Neural Information Processing Systems, vol. 2, Dec. 5, 2013, 9 Pages.

Park, et al., "The Long Tail of Recommender Systems and How to Leverage It", In Proceedings of the ACM Conference on Recommender Systems, Oct. 23, 2008, pp. 11-18.

Resnick, et al., "Recommender Systems", In Journal of Communications of the ACM, vol. 40, Issue 3, Mar. 1, 1997, pp. 56-58.

Ricci, et al., "Introduction to Recommender Systems Handbook", In Publication of Springer, Oct. 5, 2010, 35 Pages.

Rink, et al., "Product Life Cycle Research: A Literature Review", In Journal of Business Research, vol. 7, Issue 3, Sep. 1, 1979, pp. 219-242.

Schein, et al., "Methods and Metrics for Cold-Start Recommendations", In Proceedings of the 25th Annual International ACM SIGIR Conference on Research and Development in Information Retrieval, Aug. 11, 2002, pp. 253-260.

Tsukuda, et al., "DualDiv: Diversifying Items and Explanation Styles in Explainable Hybrid Recommendation", In Proceedings of the ACM Conference on Recommender Systems, Sep. 16, 2019, pp. 398-402.

Vincent, et al., "Stacked Denoising Autoencoders: Learning Useful Representations in a Deep Network with a Local Denoising Criterion", In Journal of Machine Learning Research, vol. 11, Dec. 2010, pp. 3371-3408.

Wang, et al., "Collaborative Deep Learning for Recommender Systems", In Proceedings of the 21st ACM SIGKDD International Conference on Knowledge Discovery and Data Mining, Aug. 10, 2015, pp. 1235-1244.

Wang, et al., "Collaborative Topic Modeling for Recommending Scientific Articles", In Proceedings of the 17th ACM SIGKDD International Conference on Knowledge Discovery and Data Mining, Aug. 21, 2011, pp. 448-456.

(56) References Cited

OTHER PUBLICATIONS

Wang, et al., "Collaborative Topic Regression with Social Regularization for Tag Recommendation", In Proceedings of the 23rd International Joint Conference on Artificial Intelligence, Aug. 3, 2013, 7 Pages.

Wang, et al., "Neural Graph Collaborative Filtering", In Proceedings of the 42nd International ACM SIGIR Conference on Research and Development in Information Retrieval, Jul. 21, 2019, pp. 165-174.

Wei, et al., "Collaborative Filtering and Deep Learning Based Recommendation System for Cold Start Items", In Journal of Expert Systems with Applications, vol. 69, Issue 1, Mar. 1, 2017, pp. 29-39.

Wolf, et al., "Huggingface's Tansformers: State-of-the-Art Natural Language Processing", In Repository of arXiv:1910.03771v1, Oct. 9, 2019, 11 Pages.

Wu, et al., "Collaborative Denoising Auto-Encoders for Top-N Recommender Systems", In Proceedings of the 9th ACM International Conference on Web Search and Data Mining, Feb. 22, 2016, pp. 153-162.

Zhang, et al., "Content-Collaborative Disentanglement Representation Learning for Enhanced Recommendation", In Proceedings of 14th ACM Conference on Recommender Systems, Sep. 22, 2020, pp. 43-52.

Lika, et al., "Facing the Cold Start Problem in Recommender Systems", In Journal of Expert Systems with Applications, vol. 41, Issue 4, Part 2, Mar. 2014, pp. 2065-2073.

\* cited by examiner

MODEL WITH USAGE DATA COMPENSATION

BACKGROUND

Systems are used to predict associations between users and items. The predicted associations may include one or more of a likelihood that a user will purchase an item, a likelihood a user will consume an item, or that a user will act based on an item. The item may include products and/or services. The systems may attempt to compensate for a lack of usage data with respect to certain items in order to meaningfully present newer or less prominent item offerings along with items for which there is greater usage data.

SUMMARY

The described technology provides implementations of a method of training a machine learning model. The method includes receiving labeled training data in the machine learning model, the received labeled training data including content data for items accessible to a user and input usage data representing recorded interaction between the user and the items, wherein the received content data for each item includes data representing intrinsic attributes of the item, selecting a set of the input usage data that excludes input usage data for a proper subset of the items, and training the machine learning model based on both the content data and the selected set of input usage data of the received labeled training data for the items.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
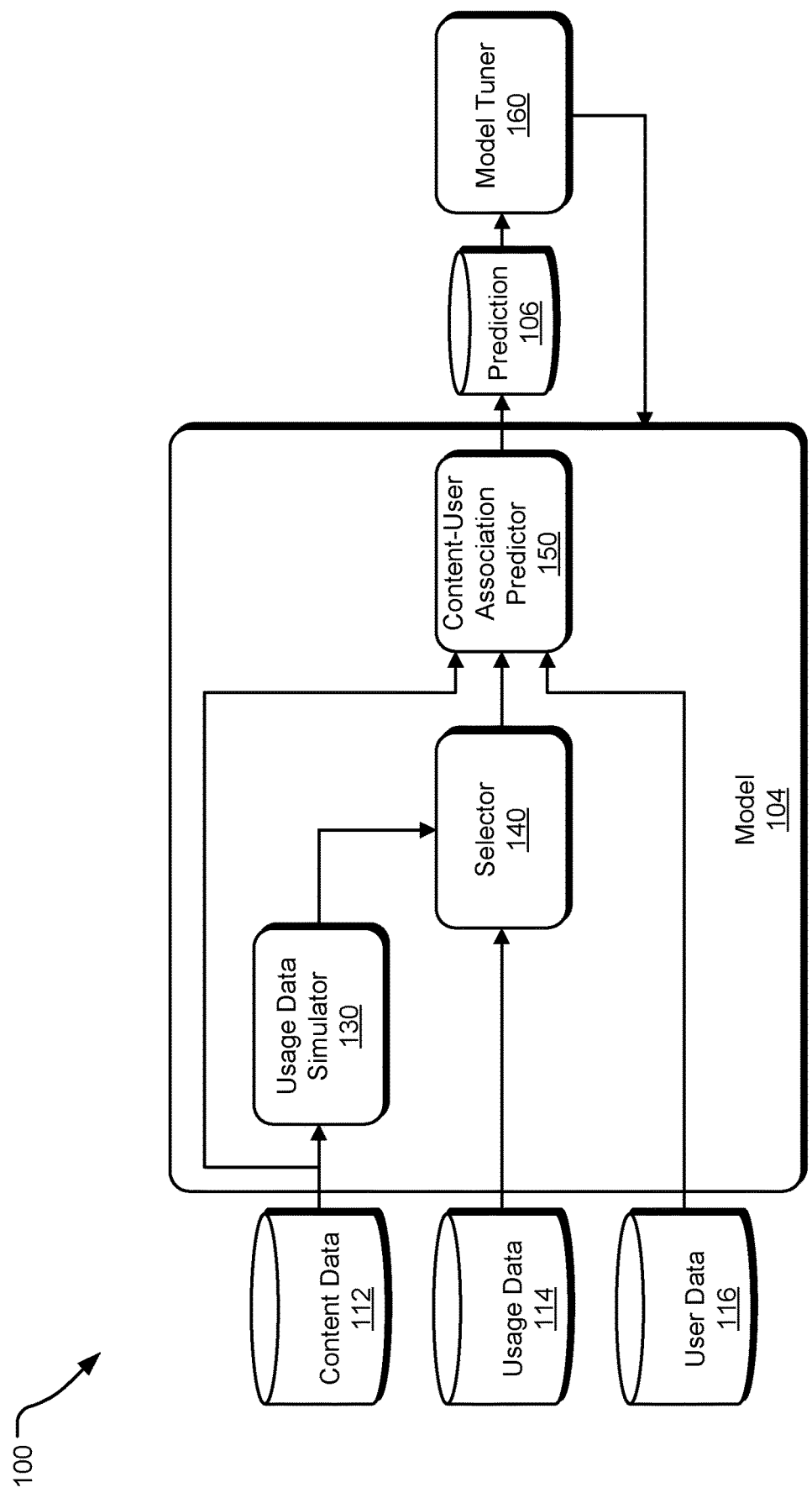
FIG. 1 illustrates an example of a system for training an inferential model.

Systems that predict associations between users and content may be deployed using inferential models. The predictions can be used to determine which items to present to a user based on the predicted associations. The models can take as input content and user data. Models may suffer if the models do not account for usage data representing usage of items by users.

Content data includes data that describes items. In implementations, the content data may include data representing intrinsic attributes of the items. An intrinsic attribute is an attribute that an object or thing (e.g., an item) has of itself, including its context and excluding relationships between the object or thing and excludes usage data. The content data may include attributes of the item that are isolated from the item's relationship a user for which a user-item association is determined. Examples of content data include an identifying label, data describing the item, a text description, codes representing the item, images of the item, The descriptive content data may exclude any usage data (e.g., popularity, purchase history, associations between the content represented by the content data and users or user data, and the like).

The content data may be provided for any item including cold items. Cold items are ones for which there is no usage data (e.g., content representing a new product or service) or for which the amount or nature of the usage data fails to satisfy a warm item condition. In an implementation, the warm item condition may include a threshold amount of usage data that represents, without limitation, one or more of consumption, purchase, indication of interest, engagement, or other association between a user and the item. Warm items have warm input data which, by contrast, has sufficient associated usage data to satisfy a warm item condition. For the purpose of this specification, an item (whether warm or cold) may be, without limitation, one or more of a product, service, offering, subscription, movie, article, application, audio signal or file, or advertisement.

Models that incorporate cold items often suffer from the "cold-start" problem. Because the cold items lack a requisite amount of usage data, a system will lack sufficient information to arrange or prioritize cold items relative to warm items for which there is sufficient usage data. For example, if an item is very popular, it may be unclear how to rank other items that have never been presented to any user to best predict the relative quality or magnitude of an association between a user and the cold item when compared with an association between the user and a warm item.

The presently disclosed technology may incorporate usage data as input for training an inferential model (e.g., a machine learning model) that, when deployed, predicts associations between items and users, regardless of whether the items are warm or cold. In implementations, the inferential model may predict or simulate usage data based on content data. This simulated usage data may be used to compensate for a lack of usage data for cold items. The training may be performed using labeled data representing warm content, and the training may selectively determine whether to use the provided usage data for warm content or simulate the usage data. The simulated usage data may be used, when the model is deployed, to provide cold item content data with supplemental simulated usage data that is determined based on the content data for the cold item and a trained usage data simulator of the machine learning model. The selection of whether to use actual warm item usage data or simulated warm item usage data in the training may be based on a random variable with a predefined probability distribution.

Training may include receiving warm content data and usage data. In implementations, the model may further receive warm user data as an input. The input data may be vectorized and organized to be input into an item-user association predictor. The content data may include a variety of content elements that can individually be represented as vectors using a content element analyzer. The vectorized content elements may be concatenated to make a single concatenated vector (or fewer vectors). In an implementation, the concatenated content element vectors may be vectorized to make an aggregated representation of the content data using an aggregate content analyzer. This may reduce the dimensionality of the concatenated vector and improve the performance of the model. This reduced vectorized representation of the content data may be introduced to the item-user association predictor as an input to predict an item-user association.

In an implementation, the concatenated vector may be provided to a usage data simulator. The concatenated vector may be provided to a content usage correlator of the usage data simulator to output a raw content-usage correlation. The raw content-usage correlation may be shifted using a shifter. The shifting may include a summation of the raw content-usage correlation with a trainable content-usage shift vector. Shifting using summing is presented for purposes of demonstration. Implementations are contemplated in which methods other than vector summing are used for the shifting or in which no shifting is used at all. The usage data simulator outputs simulated usage data based on the input content data.

The received usage data and/or user data may also be vectorized after introduction. In implementations, a selector selects whether to introduce the simulated usage data or the vectorized input usage data provided with the labeled input data to the item-user association predictor. The selector may select which usage data to send based on a random variable. In the aggregate (e.g., within an iteration, batch, or epoch of training), the selector may select a set of the input usage data that excludes input usage data for a proper subset of the items. A proper subset is a subset that does not include all elements of a set to which the subset belongs. Data representing the proper subset of items selected may include a proper subset of usage data that may be selectively excluded from data input. A usage data simulator of the machine learning model may simulate usage data based on the content data for the proper subset of the items, and the simulated usage data may be used in lieu of input usage data for that proper subset.

The selection of whether to use input warm content usage data or simulated warm content usage data in the training may be based on a random variable with a predefined probability distribution. For example, the random variable may be a Bernoulli random variable. The random variable may be based on one or more modifiable parameters. The one or more modifiable parameters may be tuned in a predefined fashion to compensate for a bias towards warm or popular content for which adequate usage data is provided.

The vectorized aggregated content data and the selected vectorized usage data (e.g., one of simulated usage data and vectorized input usage data) may be introduced to the item-user association predictor to predict an association between an item and a user. The item-user association predictor may further receive as input the user data (vectorized or otherwise) and use the user data in conjunction with the other inputs to predict the association between the user and the content.

The prediction of the association between the user and an item can be compared with a labeled association between the relevant item and user in a model tuner. Based on the comparison, the model tuner may determine a loss. The loss may then be backpropagated through the inferential model to hone elements of the inferential model including one or more of content element analyzers, aggregate content analyzers, usage data simulators (e.g., one or more of the content-usage correlator and content-usage shift vector), and the item-user association predictor.

In implementations, the training may be conducted within a closed universe of warm input data. In this implementation, the loss may be further backpropagated to the inputted warm data (e.g., modifying the original data or vectorized data representing one or more of the content data, usage data, and user data). This may further refine the model itself.

After training, the model may be deployed for use with cold item data in order to provide a robust association between cold items and users based on the training that used the warm content data. When deployed for use with cold items, the selector may be deactivated such that the model does not attempt to accept cold item usage data that does not exist or is too limited to be material. The item-user association predictor may output a predicted cold-user-item association between a user and the cold item. With this prediction, the cold item may be prioritized or otherwise ranked against warm items using the usage data context provided by training the model. This may mitigate some issues associated with the cold-start problem.

FIG. 1 illustrates an example of a system 100 for training an inferential model. The system 100 includes a model 104 that is trainable by a model tuner 160. In implementations, the model 104 is an inferential model. Examples of inferential models can include, without limitation, one or more of machine learning models, data mining algorithms, artificial intelligence algorithms, masked learning models, natural language processing models, neural networks, artificial neural networks, perceptrons, feed-forward networks, radial basis neural networks, deep feedforward neural networks, recurrent neural networks, long/short term memory networks, gated recurrent neural networks, autoencoders, variational autoencoders, denoising autoencoders, sparse autoencoders, Bayesian networks, regression models, decision trees, Markov chains, Hopfield networks, Boltzmann machines, restricted Boltzmann machines, deep belief networks, deep convolutional networks, genetic algorithms, deconvolutional neural networks, deep convolutional inverse graphics networks, generative adversarial networks, liquid state machines, extreme learning machines, echo state networks, deep residual networks, Kohonen networks, support vector machines, federated learning models, and neural Turing machines.

The system 100 introduces labeled input data including one or more of content data 112, usage data 114, and user data 116 to the model 104. The label of the labeled input data may represent a known association between a user and an item (e.g., corresponding with input data representing one item and one or more of one user and one known usage relating the item and the user). The content data 112 is data that describes the item (e.g., excluding one or more of usage data, user data, or data describing associations with particular users). The content may be one or more of a product, a service, an offering, an entity, a request, a query, and the like. The content data can include, without limitation, one or more of text describing the item, images of the item, features or attributes of the item, codes used to categorize the item, classifications of the item, an item or content provider's description of the item, and the like. The usage data 114 is data that describes existing interactions between the items and users. For example, the usage data may include, without limitation, one or more of user purchases of an item, user consumption of an item, user subscription to an item, user stated preferences regarding an item, user feedback regarding an item, user recommendations regarding an item, user preferences regarding known related items, and generated recommendations based on other existing interactions. User data 116 is data that is used to identify the user. The user data 116 can include information to identify the specific user in a manner useable by the system, such as by a user identifier.

The introduced labeled input data may be warm item data. Cold item data is data that represents an item for which there is no usage data 114 (e.g., data representing a new product or service) or for which the amount or nature of the usage data 114 fails to satisfy a warm item condition. The warm item condition may include a threshold of one or more of consumption, purchase, an indication of interest, engagement, or other association between a user and the item. Warm items, by contrast, have sufficient associated usage data 114 to satisfy a warm item condition.

Implementations are contemplated in which content data 112 and usage data 114 are introduced to the model 104 to train the model 104 to the exclusion of user data 116. In other implementations, the user data 116 is used as further input. Implementations are contemplated in which one or more of the content data 112, usage data 114, and user data 116 are vectorized in the model 104. In implementations, the vectorized versions may be internal to the model 104 and/or may be modified by backpropagating loss to the vectorized forms of the one or more of content data 112, usage data 114, and user data 116.

The content data 112 may contain data representing different content elements. For example, the content data 112 may include content elements such as a description, a content ID, content images, and the like of an item. The content data may be processed by first passing each content element through a content element analyzer, which may output a vectorized representation of the content element (e.g., in a space for content elements of the same type for other items). The output vectorized representations may be concatenated to form a concatenated content vector. The concatenated content vector can be further consolidated using an aggregate content analyzer that outputs an aggregated content data representation (e.g., a reduced vector representation of the concatenated content vector) for input into an item-user association predictor 150.

In implementations, the concatenated content vector may also be provided to a usage data simulator 130 to predict or simulate usage data based on the content data 112. In these implementations, the model 104 may further include a selector 140 that selects whether to make a prediction based on simulated usage data from the usage data simulator 130 or input usage data (e.g., a vectorized representation of usage data 114). In the aggregate (e.g., within an iteration or epoch of training), the selector 140 may select a set of the input usage data that excludes input usage data for a proper subset of the items. A proper subset is a subset that does not include all elements of a set to which the subset belongs. Data representing the proper subset of items selected may include a proper subset of usage data that may be selectively excluded from data input. The usage data simulator 130 of the model 104 may simulate usage data based on the content data for the proper subset of the items, and the simulated usage data may be used in lieu of input usage data for that proper subset. The selected usage data is introduced to the item-association predictor 150. In so doing, during training, the usage data for a subset of items may be excluded (with the simulated usage data substituting for the excluded usage data). Implementations are also contemplated in which there is no usage data simulator 130 and no selector 140, such that the usage data 114 or some processed or vectorized version thereof is directly introduced to the item-user association predictor 150.

The item-user association predictor 150 outputs a prediction 106 regarding an association between an item and a user. The prediction 106 may include a probability that the particular association is true for the item and the user (e.g., a user is likely to purchase an item, a user is likely to consume an item, a user is likely to recommend an item, a user is likely to ignore an item, a user is unlikely to subscribe to an item, etc.). The model 104 may have an activation layer that presents the output as a discrete value. For example, a minus one may represent that an association is unlikely, and a positive one may represent that an association is likely. Because the input data is labeled, the model tuner 160 can take the prediction 106, compare it with a label (e.g., a ground-truth value for the association), and determine a loss based on the difference between the prediction 106 and the label. The model tuner 160 may backpropagate the loss to elements of the model, the elements including, without limitation, one or more of the item-user association predictor 150, the selector 140, the usage data simulator 130, and elements used to vectorize the input data, and vectorized representations of the input data (e.g., vectorized forms of one or more of the content data 112, usage data 114, and user data 116). The labeled input data may include data for multiple items, and the model may be trained over any number of iterations and/or epochs to yield a trained version of model 104.

In implementations, the trained version of model 104 may be configured to receive unlabeled input data regarding cold items. The selector 140 may be modified to only select simulated usage data, as the cold item may not have sufficient usage data 114 to input into the model 104 (or the usage data 114 may be insufficient to satisfy a warm item condition). In this implementation, the item-user association predictor 150 will take the simulated usage data as input to make the prediction 106. This simulated usage data may be used to compensate for a lack of usage data for cold items. In this way, cold item-user associations can be harmonized with warm item-user associations, as the simulated usage data is based on an inferred relationship between warm usage data and warm content data via the usage data simulator 130.

Figure 2:
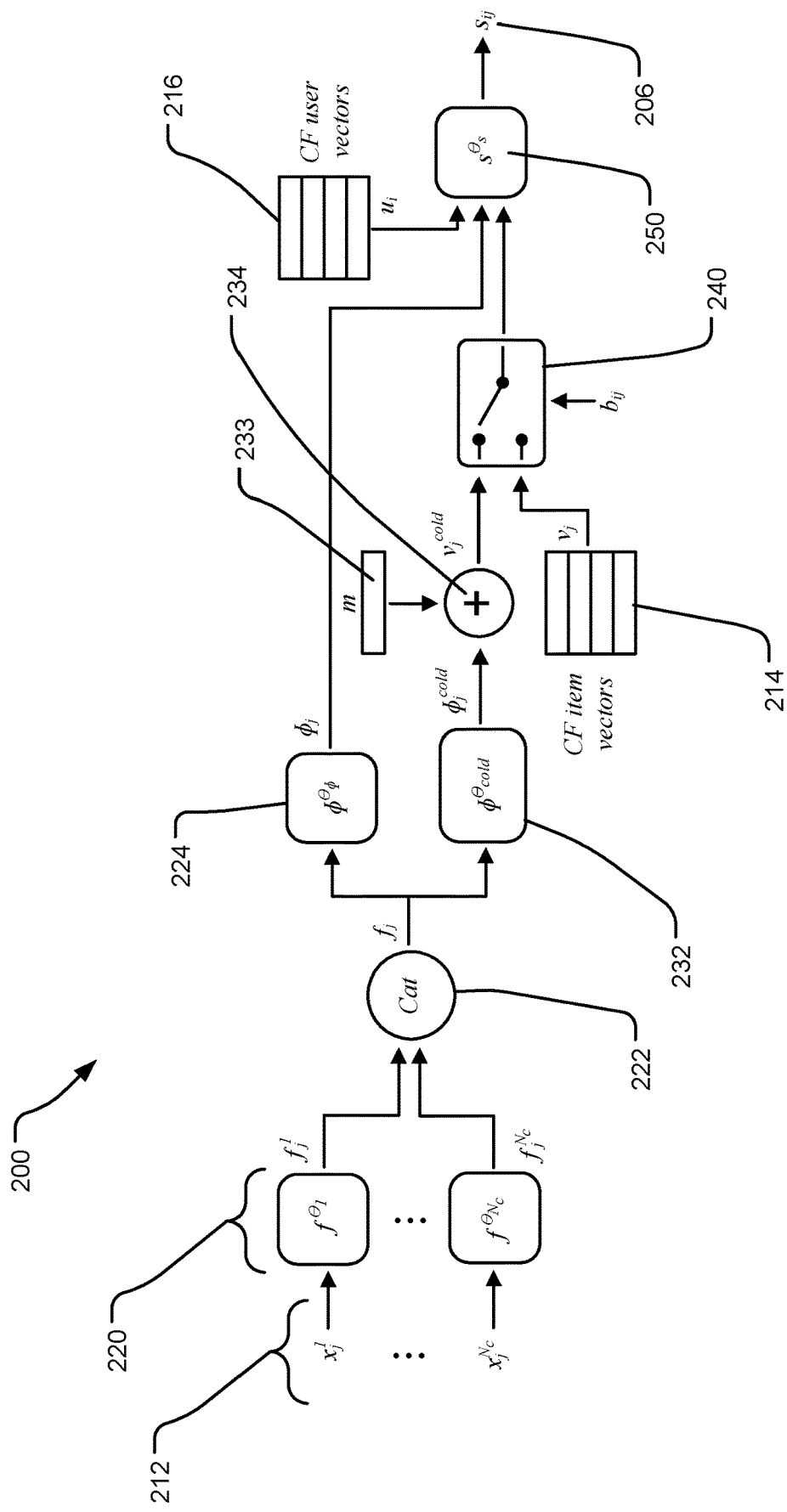
FIG. 2 illustrates another example of a system for training an inferential model.

FIG. 2 illustrates another example of a system 200 for training an inferential model. The system 200 provides content data 212. The content data 212 includes content elements $x_j^1$-$x_j^{N_c}$ for an item $x_j$ (note that each j refers to an item). Each content element $x_j^1$-$x_j^{N_c}$ is introduced to an associated content element analyzer 220, the associated content element analyzer 220 operable to ingest each element $x_j^1$-$x_j^{N_c}$ of item $x_j$ and output a content element representation $f_j^1$-$f_j^{N_c}$ for each element $x_j^1$-$x_j^{N_c}$. For example, the content element analyzer may include content element-specific analyzer functions $$f^{\theta_1} - f^{\theta_{N_c}}$$

The content element representations may be concatenated by a concatenator 222 to make a single concatenated content vector $f_j$. The concatenated content vector $f_j$ may then be provided to an aggregate content analyzer 224 including an aggregating function $\Phi^{\theta_\Phi}$ to output an aggregated content vector $\theta_j$.

In implementations where the model is trained based on a selection of either simulated usage data or input usage data, the concatenated content vector $f_j$ may be provided to a content-usage correlator 232 of a usage data simulator to output raw simulated usage data $\Phi_j^{cold}$ (the cold designator represents that this parameter is used with cold item content data when the model is deployed after training) using function $\Phi^{\Theta_{cold}}$. The raw simulated usage data $\Phi_j^{cold}$ is provided to a shifter 234 of the usage data simulator to be shifted by a content-usage shift vector 233 (also represented as "m") of the usage data simulator. In an implementation, the shifter 234 shifts by summing the shift vector 233 with the raw simulated usage data $\Phi_j^{cold}$. The shifter 234 outputs simulated usage data $v_j^{cold}$.

The model may also receive one or more of usage data 214 and user data 216. The usage data 214 may be vectorized in the model to be presented as vectorized usage data 214 with individual usage vectors $v_j$. Similarly, the user data 216 may be vectorized in the model to be presented as vectorized user data 216 with individual user vectors $u_i$. Implementations are contemplated in which the model is trained without user data input, such that vectorized user data 216 may be omitted.

In implementations in which training the model involves selecting between an input usage data vector $v_j$ and simulated usage data $v_j^{cold}$, the system 200 may include a selector 240. The selector 240 may select which of the input usage data vector $v_j$ and simulated usage data $v_j^{cold}$ is introduced to the item-user association predictor 250 for generating a prediction 206. The selection of whether to use input usage data $v_j$ or simulated usage data $v_j^{cold}$ in the training may be based on a random variable $b_{ij}$ with a predefined probability distribution. For example, the random variable $b_{ij}$ may be a Bernoulli random variable. The random variable $b_{ij}$ may be based on one or more modifiable parameters (e.g., modifiable popularity bias correction parameters). The one or more modifiable parameters may be tuned in a predefined fashion to compensate for a bias towards warm or popular items for which adequate usage data is provided (by comparison with limited or no usage data associated with cold items). In the aggregate (e.g., within an iteration or epoch of training), the selector 240 may select a set of the input usage data that excludes input usage data for a proper subset of the items. A proper subset is a subset that does not include all elements of a set to which the subset belongs. Data representing the proper subset of items selected may include a proper subset of usage data that may be selectively excluded from data input. The usage data simulator 230 of the model of system 200 may simulate usage data based on the content data for the proper subset of the items, and the simulated usage data of $v_j^{cold}$ may be used in lieu of input usage data $v_j$ for that proper subset.

The item-user association predictor 250 with function $s^{\Theta_s}$ receives inputs including one or more of user data (e.g., user data vector $v_i$ of usage data vectors 214), usage data (e.g., a usage data vector $v_j$ in implementations without a selector 240 or a selected one of input usage data $v_j$ or simulated usage data of $v_j^{cold}$ in implementations with a selector 240), and content data (e.g., aggregated content vector $\theta_j$). The item-user association predictor 250 outputs a prediction 206 (also indicated as $b_{ij}$, the i index referencing a particular user and the j index referencing a particular item).

The model of system 200 may represent a single end-to-end hybrid model that balances two conflicting objectives: learning warm and cold item representations in a single unified recommender system. By employing a simple yet effective control selector 240, fake cold item usage data is simulated by selectively excluding warm item usage data during the training phase to force the model to adapt to both cold and warm content, simultaneously. Moreover, the model employs a dual content representation for cold items (aggregated content vector $\theta_j$ and simulated usage data $v_j^{cold}$) that compensates for the absence of the usage data and alleviates the aforementioned conflicting roles of the content data. Hence, the model may provide the following advantages: (1) A model that is capable of effectively handling both warm and cold items, simultaneously; (2) A unified training procedure that improves accuracy; and (3) A framework to balance between warm and cold item learning.

The model may be described as follows. Let $\mathcal{J} = \{i\}_{i=1}^{N_u}$ and $\mathcal{J} = \{j\}_{j=1}^{N_v}$ be index sets of $N_u$ users and $N_v$ items, respectively. In addition, it may be assumed that each item j is associated with $N_c$ types of content (information sources), $X_j = \{x_j^k\}_{k=1}^{N_c}$, where $x_j^k \in \mathcal{C}^k$ represent item j's kth content element source. For example, $\mathcal{C}^2$ can be content images (a visual signal), and $\mathcal{C}^5$ can be the content descriptions (unstructured text). The aggregate content for the entire set of pieces of content is denoted by $X = \{X_j\}_{j=1}^{N_v}$. The set of user-item interactions can be represented by $I_y = \{(i,j) | \text{user } i \text{ consumed item } j\}$. In addition, Y is defined as $Y = \{y_{ij} | (i,j) \in \mathcal{J} \times \mathcal{J}\}$, where $y_{ij}$ is a two-point observed random variable s.t. $y_{ij} = 1$ if $(i,j) \in I_y$, and $y_{ij} = -1$ otherwise. Namely, $y_{ij}$ indicates whether the user i consumed the item j or not.

For the model of system 200, $f^{\Theta_k}: \mathcal{C}^k \to \mathbb{R}^{d_k}$ is a content element analyzer 220 function (parameterized by $\theta_k$) that maps $x \in \mathcal{C}^k$ to a $d_k$-dimensional vector $f^{\Theta_k}(x)$. For example, $f^{\Theta_k}$ may be a deep neural network that analyzes the item's textual description (e.g., BERT [11]) or visual content (e.g., ResNet [17]), and encodes it as a $d_k$-dimensional vector. The unobserved parameters $\theta_k$ are learned during the model's training phase. For simplicity, the relationship simplified relationship $f_j^k \triangleq f^{\Theta_k}(x_j^k)$, which stands for the application of the content analyzer $f^{\Theta}_k$ to the content information of type k that is associated with the item j, can be used. In addition, $\theta_{CB} = \{\theta_1, \ldots, \theta_{N_c}\}$ can be collectively denoted (Where CB represents collaborative filtering).

In an implementation $\phi^{\Theta_\phi}: \mathbb{R}^{d_\phi} \to \mathbb{R}^d$, where $d_\phi = \sum_{k=1}^{N_c} d_k$, is an aggregated content analyzer 224 that receives the concatenated multiview representation $f_j = [f_j^1, \ldots, f_j^{N_c}]$ and outputs the following d-dimensional vector: $\phi_j \triangleq \phi^{\Theta_\phi}(f_j)$. Therefore, $\phi_j$ may encode all types of content that may be associated with item j. In an implementation, $\phi^{\Theta_\phi}$ is set to be a fully connected neural network with a single ReLU activated hidden layer.

In an implementation, $U = \{u_i\}_{i=1}^{N_u}$ and $V = \{v_j\}_{j=1}^{N_v}$ may represent the unobserved user and item representations (U, V $\mathbb{R}^d$). In order to score the affinity or association between user i and item j, a neural scoring function $s^{\Theta_s}: \mathbb{R}^d \times \mathbb{R}^d \times \mathbb{R}^d \to \mathbb{R}$ (parameterized by $\theta_s$) that receives $u_i$, $\phi_j$ and $v_j$ as input and outputs an affinity score (scalar) or item-user association is defined. In this work, $s^{\Theta_s}$ is parameterized by $\theta_s = \{W_2, W_1, W_0, r_2, r_1, r_0\}$ as follows:

$$s^{\Theta_s}(u_i, v_j, \phi_j) = W_2 h_{ij}^1 + r_2, \qquad (2)$$

where $$h_{ij}^1 = \text{ReLU}(W_1 h_{ij}^0 + r_1), h_{ij}^0 = [u_i, q_j^1]^T, q_j^1 = \text{ReLU}(W_0 q_j^0 + r_0), q_j^0 = [v_j, \phi_j]^T, \qquad (3)$$

with $W_2 \in \mathbb{R}^{1 \times d}$, $W_1, W_0 \in \mathbb{R}^{d \times 2d}$, $r_1, r_0 \in \mathbb{R}^d$ and $r_2 \in \mathbb{R}$. Hence, $s^{\Theta_s}$ is a neural network with two ReLU activated hidden layers: The first hidden layer produces an item vector $q_j^1$ that combines the collaborative filtering (CF) and content-based (CB) information of the item j. The second hidden layer may combine the CF user vector $u_i$ with $q_j^1$ to a single representation $h_{ij}^1$ that is finally transformed to a score via a linear classifier. For simplicity, $s \triangleq s^{\Theta_s}$. Finally, the likelihood of a user i to like (or dislike) an item j is given by:

$$p(y_{ij} | u_i, v_j, \phi_j, \theta_s) = \sigma(y_{ij} s(u_i, v_j, \phi_j)), \qquad (4)$$

where $$\sigma(z) \triangleq \frac{1}{1+\exp(-z)}$$

is the logistic function. Each content type $x_j^k$ (associated with the item j) is passed through a corresponding content analyzer network 220 that encodes it as a vector $f_j^k$. The aggregate content encoding $f_j$ is processed through $\phi^{\theta_\phi}$ and $\phi^{\theta_{cold}}$ to produce the CB representation $\phi_j$ and the CF compensation $v_j^{cold}=m+\phi_j^{cold}$ respectively. During training, for each training example (i,j), the parameter $b_{ij}$ is sampled (stochastically) from a Bernoulli distribution with a success probability $p_b(\gamma, c_j)$ that is determined by a modifiable hyperparameter (tunable knob) $\gamma \in [0,1]$ and $c_j$—the (normalized and optionally modifiable) popularity of the item j. If $b_{ij}=0$, the model may behave as a regular hybrid model passing the CF item representation $v_j$ through the stochastic gate as input to the subsequent neural scoring function $s^{\theta_s}$. Otherwise, $b_{ij}=1$ and $v_j^{cold}$ passes through the stochastic gate (instead of $v_j$), simulating a cold start scenario. In the inference phase, we compute the odds of user i to like an item j by setting $b_{ij}=0$ for a warm item (j∈ $\mathcal{J}$) or $b_{ij}=1$ for a cold item (j∉ $\mathcal{J}$).

The model includes a novel mechanism that fakes or otherwise simulates completely cold items and forces the model to fully utilize the CB information in cases where the CF information is not available (as in completely cold items). Harmonizing cold and warm content associations with users can pose a challenge when dealing with a completely cold item a. In this case, the item a is associated with the content representation $\phi_a$ only, while the CF representation $v_a$ is missing. This may be a common scenario in real-world practice. Since the model may never actually encounter completely cold examples during training (by definition), it may not adapt to this case. In other words, since completely cold items do not appear in the training data, the model is never actually required to use the aggregate content representation $\phi_a$ alone. Instead, the model treats the aggregate content representation $\phi_a$ as a mere 'correction' over the CF representation $v_a$, and when $v_a$ is missing, the item's representation is incomplete. Without proper treatment, the results on cold items may be suboptimal.

In order to alleviate the aforementioned problem, the model simulates cold-start scenarios during the training phase. To this end, the probability of an item-user association can be modeled as:

$$p(y_{ij} | u_i, v_j, v_j^{cold}, b_{ij}, \phi_j, \theta_s) = \quad (5)$$
$$\sigma(y_{ij} s(u_i, (1-b_{ij})v_j + b_{ij} v_j^{cold}, \phi_j)).$$

The probability in Equation 5 introduces two new terms, $b_{ij}$ and $v_j^{cold}$. $b_{ij}$ may represent a stochastic gate or selector 240, based on an observed Bernoulli variable, that determines the likelihood state of the item as either warm or cold. At each iteration, $b_{ij}$ is re-sampled from a Bernoulli distribution. In the warm state ($b_{ij}=0$), the likelihood falls back to Equation 4. However, in the cold state ($b_{ij}=1$), the likelihood simulates a cold start scenario, where the term $v_j^{cold} \in \mathbb{R}^d$ replaces the missing CF representation $v_j$. The distribution of $b_{ij}$ may include a tunable parameter (success probability) based on the popularity distribution of warm items. $v_j^{cold}$ may represent a summation: $v_j^{cold}=m+\phi_j^{cold}$, where $\phi_j^{cold} \triangleq \phi^{\theta_{cold}}(f_j)$, and $\phi^{\theta_{cold}}: \mathbb{R}^{d_\phi} \to \mathbb{R}^d$ is a neural network with an identical architecture as $\phi^{\theta_\phi}$, but parameterized by a different set of (learned) parameters $\theta_{cold}$*m∈ $\mathbb{R}^d$ is a global learned embedding vector (independent of j) that can be seen as a global positional bias.

The role of $b_{ij}$ is to expose the model to fake or simulate completely cold items during training. In this case ($b_{ij}=1$), $v_j^{cold}$ is used instead of the CF representation $v_j$, ensuring the model learns a CF compensation based on the items' content. It is important to clarify that $\phi^{\theta_\phi}$ and $\phi^{\theta_{cold}}$ may play different roles: $\phi^{\theta_{cold}}$ is trained to produce $\phi_j$— an aggregated content CB vector which enhances the learned CF input usage data representation with complementary CB information. On the other hand, $\phi^{\theta_{cold}}$ together with m are trained to replace the missing usage data CF representation in the cold start scenario. Then, in the inference phase (when deployed), when a completely cold item a is introduced to the system, the role of $\phi_a^{cold}$ (which may be further shifted by shifter 234 to make of $v_j^{cold}$) is to replace and compensate for the missing CF representation $v_a$ based on its content data $X_a$.

The combination of the selector 240 gate variable $b_{ij}$, together with the network $\phi_j^{cold}$, forms a novel architecture and a key contribution of the harmonization model that alleviates the aforementioned conflicting roles of the CB data as well as the discrepancy between training and inference in hybrid recommenders.

In many collaborative filtering datasets, items exhibit a power-law distribution in which few popular items account for most of the user-items interactions in the dataset. As a consequence, the model's exposure to specific types of content is imbalanced as well. For example, consider an exemplary dataset where the items are movies. One type of content metadata is the set of actors participating in each movie. Naturally, popular actors are mostly associated with popular movies. As a result, the model's exposure to actors may be imbalanced: less popular actors are rarely introduced to the model, and the model's ability to learn their CF compensation via $v_j^{cold}$ may be limited.

To mitigate this problem, the probability of simulated fake cold-start scenarios is suppressed for popular items but is enhanced in the case of rare items. By taking this approach, the model's exposure is equipoised to types of content as follows: Denote the normalized popularity score of item j by $0 \leq c_j \leq 1$, where $c_{max}=1$ is associated with the most popular item, and $c_{min}=0$ is associated with the least popular item i.e. by employing min-max normalization. Then, the parameter of the Bernoulli variable $b_{ij}$ is set to be $p_b(\gamma, c_j)=\gamma^{2c_j}$.

Figure 3:
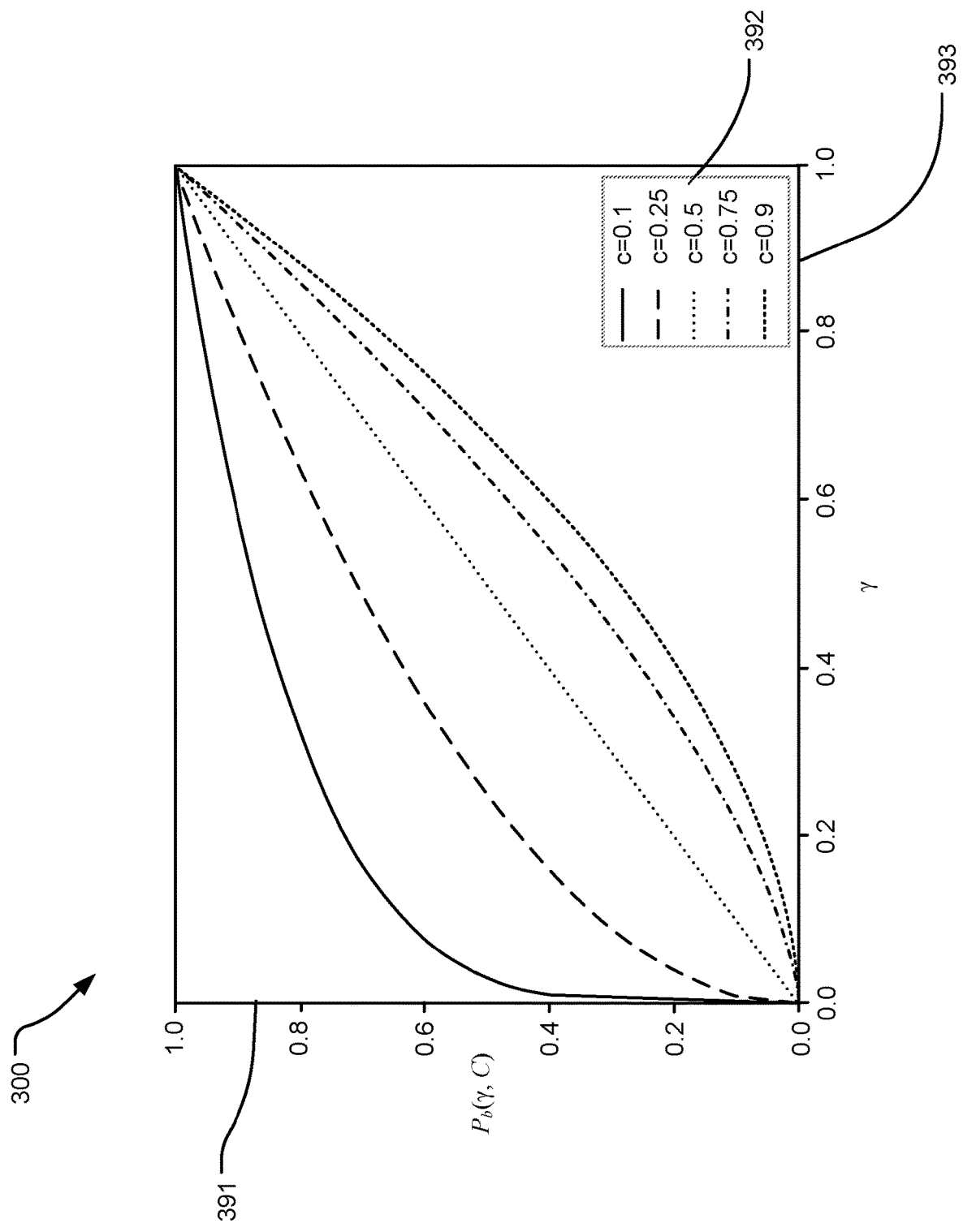
FIG. 3 illustrates an example graph of probability distributions for different popularity scores.

FIG. 3 illustrates an example graph 300 of probability distributions $p_b(\gamma, c_j)$ for different popularity scores (e.g., modifiable parameters). The graph 300 includes an abscissa axis 393 representing the modifiable parameter, $\gamma$, and an ordinate axis 391 representing the probability, $p_b(\gamma, c_j)$, of selecting whether to use input usage data or simulated usage data. The graph 300 further includes a key describing curves for different values of the popularity score, $c_j$. As seen in FIG. 3, popular items with popularity scores of $$c_j > \frac{1}{2}$$

produce a convex behavior of $p_b(\gamma, c_j)$ with respect to the control knob $\gamma$, while rare items with a popularity score $$c_j < \frac{1}{2}$$

produce a concave behavior of $p_b(\gamma, c_j)$ with respect to $\gamma$. As a consequence, the probability to use $v_j^{cold}$ for an item j with a popularity score of $$c_j > \frac{1}{2}$$

would be less than $\gamma$, and the probability to use of $v_j^{cold}$ for item j with a popularity score $$c_j < \frac{1}{2}$$

would be greater than $\gamma$. A careful selection of $p_b$ is highly beneficial for the model's ability to learn CF compensation via of $v_j^{cold}$.

For purposes of the selector, $B=\{b_{ij}|(i,j) \in \mathcal{J} \times \mathcal{J}\}$ and $\Theta=\{U, V, m, \theta_{CB}, \theta_\phi, \theta_{cold}, \theta_s\}$. Then, by assuming normal priors over the unobserved model variables, the negative log joint distribution can be represented as follows:

$$\mathcal{L} = -\log p(Y, \Theta | B, X) = -\log[p(Y | \Theta, B, X)p(\Theta)] \quad (6)$$

$$\square = -\Sigma_{(i,j) \in \mathcal{J} \times \mathcal{J}} \log[\sigma(y_{ij} s(u_i, (1-b_{ij})v_j + b_{ij} v_j^{cold}, \phi_j)]$$

$$\square + \frac{\tau}{2}\left[\|\theta_s\|_2^2 + \|\theta_{cold}\|_2^2 + \|\theta_\phi\|_2^2 + \sum_{i=1}^{N_u} \|u_i\|_2^2\right.$$

$$\square + \left.\sum_{j=1}^{N_v} \|v_j\|_2^2 + \sum_{k=1}^{N_c} \|\theta_k\|_2^2\right] + const,$$

where $\tau$ is the precision hyperparameter that controls the strength of the normal prior (similar to $L_2$ regularization). In practice, the negative examples $((i,j) \notin I_y)$ that appear in the likelihood term in Equation 6 are sampled in a stochastic manner. A Maximum A-Posteriori (MAP) estimation, which is equivalent to the minimization of $\mathcal{L}$ w.r.t. the unobserved variables: $\Theta^* =_\Theta \mathcal{L}$, where the optimization is carried out using stochastic gradient descent is used. At inference, the odds of user i to have an association with an item j (e.g., a probability that user i will like item j) is computed by following Equation 5 by setting $y_{ij}=1$, with $b_{ij}=0$ or $b_{ij}=1$ if j is warm ($j \in \mathcal{J}$) or cold ($j \notin \mathcal{J}$), respectively.

In an implementation, several completely cold items are integrated into an existing warm catalog of items. An inherent trade-off arises when integrating warm and cold items together and the disclosed technology may demonstrate the ability of the model to gently balance between the two objectives: preserving the performance on the warm catalog and promoting the items from the new (completely cold) catalog. The model may function as a hybrid recommender system utilizing both usage data (implicit ratings) as well as a diverse set of items' content metadata.

Evaluations may be based on a user-item association prediction task (e.g., the ability to recommend the correct item to the right user). Datasets may consist of users and their lists of items (items purchased or consumed by each user). Examples of datasets with rich content data on the items may include one or more of movies, articles, and applications with which users may form an association (like, purchase, consume, etc.)

The training data may be split into input training and testing data. In an implementation, training and testing are conducted with data of users for which associations are provided with at least eight pieces of content. For each user, two items may be randomly drawn to form the test set and another two items to form the validation set. Then, twenty percent of the items are selected and all their interactions are removed from the training set in order to simulate cold items. Half of these items (10% of the 20%), may be used in the validation set and the second half may be used for the test set. Cold items that were selected for the validation set, may be removed from the test set and vice versa. The warm and cold items in the test set may be used for a first part (P1) of the evaluations, while in the second part (P2) of the evaluation the warm items may be used without the (completely) cold items that do not appear in the training set. Hence, the second part (P2) of the evaluation is comparable to an evaluation of the model of the system 200. The validation set may be used to tune the model's hyperparameters. Each experiment may be run a number of times (e.g., ten) with different realizations of the train/validation/test partition and report the mean results.

Special care may be used in the selection process of the simulated cold items. The items' content distributions are not likely statistically independent of content popularity. In other words, popular items exhibit different content distribution than the content distribution of rare items. Hence, without a proper selection of cold items, the evaluations could be inaccurate, inconsistent, and irreproducible in the real world, especially in datasets with a small number of items or a high popularity skew.

When new items are introduced to the system, these items may be treated as cold. However, it may not be safe to assume that these items will remain unpopular in the long run. If evaluations focus on the unpopular items, the results may not reflect the actual business scenario at hand: introducing new items that may, with time, become popular. In other words, a real-world model may need to handle different cold (new) items, some of which may be expected to become popular in the future while others may remain unpopular also in the long run. Therefore, the popularity of items in the test set may follow that of regular items in the training set.

In order to compel similar popularity distributions between the train, test, and validation sets, the following procedure may be used: (1) Sort the items according to their popularity. Then, (2) select each item for the test set and its successive item for the validation set. The rest of the items include the train set (the ratios can be adjusted as needed). Different folds are obtained by considering different offsets. The resulting train, test, and validation sets may include cold items that exhibit a similar popularity distribution that substantially emulates introducing new items in a real-world scenario.

The model of the system 200 may adaptably integrate multiple cold items into an existing model (of warm items) and produce recommendation lists that include both cold and warm items. This adaptable integration may be controlled by the $\gamma$ hyperparameter that serves as a knob or selector 240 to control the exposure rate of the of $v_j^{cold}$ token at the training phase. When $\gamma=0$, the model may not be exposed to cold items and may act as a hybrid model with no simulation of usage. This would emphasize warm item recommendations. While it may produce cold item representations based on its content analyzers, these representations are sub-optimal. When $\gamma=1$, the model may be exposed exclusively to cold items. As a consequence, it may not learn CF item representations and may collapse to a pure CB model. When γ=1, the model may be agnostic to whether an item is warm or cold since it considers its content only.

In implementations, an insufficient exposure of the model to cold items may limit the model's ability to generalize for such items. In contrast, over-exposure to cold items may limit the model's performance for the warm items. This trade-off is evident in FIG. 3 with different exposure levels (0≤γ≤1). The results in FIG. 3 align with the aforementioned theory. Specifically, one can notice that when γ=1, the warm and cold lines converge (up to an empirical variance).

Figure 4:
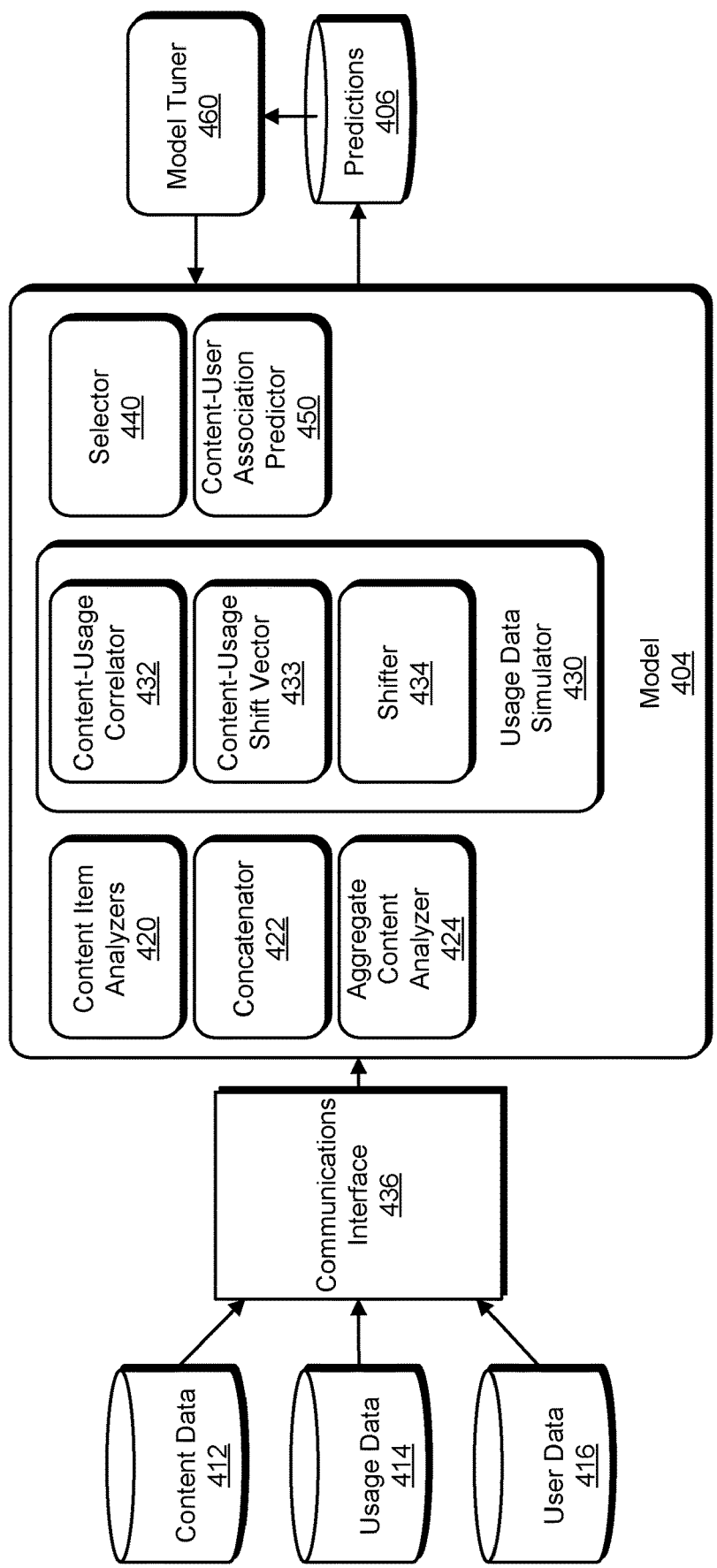
FIG. 4 illustrates still another example of a system for training an inferential model.

FIG. 4 illustrates still another example of a system 400 for training an inferential model. The model 404 may receive labeled input data including one or more of content data 412, usage data 414, and user data 416 via a communications interface. The label of the labeled input data may represent a known association between a user and an item. The model 404 may modify the input data, such as by reformatting or vectorizing the input data. The usage data 414 may be vectorized in the model 404 to be presented as vectorized usage data with individual usage vectors. Similarly, the user data 416 may be vectorized in the model to be presented as vectorized user data with individual user vectors. Implementations are contemplated in which the model is trained without user data 416 input, such that vectorized user data may be omitted.

Specifically, the content data 412 may include multiple content elements (e.g., text descriptions, titles, identifiers, product codes, identifiers, etc.) for each item. Each element of content may be analyzed by a content element analyzer 420 specific to the type of content element to yield a content element representation. The content element representations may be concatenated by a concatenator 422 to yield a concatenated content vector. The concatenated content vector may then be provided to an aggregate content analyzer 424 to output an aggregated content vector. The aggregated content vector may be provided as input to an item-user association predictor 450.

In implementations that use a selector 440 to select between input usage data (e.g., vectorized usage data 414) and simulated usage data provided by a usage data simulator 430 to provide as input to the item-user association predictor 450, the concatenated content vector may also be provided to a content-usage correlator 432 that correlates usage data and content data to output raw simulated usage data. The raw simulated usage data may be provided to a shifter 434 of the usage data simulator 430 to be shifted by a content-usage shift vector 433 of the usage data simulator 430. In an implementation, the shifter 434 shifts by summing the shift vector 433 with the raw simulated usage data. The shifter 434 outputs simulated usage data.

In implementations in which training the model 404 involves selecting by a selector 440 between an input usage data vector and simulated usage data, the selector 240 may select which one of the input usage data vector and simulated usage data is introduced to the item-user association predictor 450 for generating a prediction 406. The selection of whether to use input usage data or simulated usage data in the training may be based on a random variable with a predefined probability distribution. For example, the random variable may be a Bernoulli random variable. The random variable may be based on one or more modifiable parameters. The one or more modifiable parameters (e.g., modifiable popularity bias correction parameters) may be tuned in a predefined fashion to compensate for a bias towards warm or popular content for which adequate usage data is provided (by comparison with limited or no usage data associated with cold items).

In the aggregate (e.g., within an iteration or epoch of training), the selector 440 may select a set of the input usage data that excludes input usage data for a proper subset of the items. A proper subset is a subset that does not include all elements of a set to which the subset belongs. Data representing the proper subset of items selected may include a proper subset of usage data that may be selectively excluded from data input. The usage data simulator 430 of the model 404 may simulate usage data based on the content data for the proper subset of the items, and the simulated usage data may be used in lieu of input usage data for that proper subset.

The item-user association predictor 450 receives inputs including one or more of user data (e.g., user data vector of usage data vectors), usage data (e.g., a usage data vector in implementations without a selector 440 or a selected one of input usage data or simulated usage data in implementations with a selector 440), and content data (e.g., an aggregated content vector).

The item-user association predictor 450 outputs a prediction 406 regarding an association between an item and a user. The prediction 406 may include a probability that the particular association is true for the item and the user (e.g., a user is likely to purchase an item, a user is likely to consume an item, a user is likely to recommend an item, a user is likely to ignore an item, a user is likely to subscribe to a service to get the item, etc.). The model 404 may have an activation layer that presents the output as a discrete value. For example, a minus one may represent that an association is unlikely, and a positive one may represent that an association is likely. Because the input data is labeled, the model tuner 460 can take the prediction 406, compare it with a label (e.g., a ground-truth value for the association), and determine a loss based on the difference between the prediction 406 and the label. The model tuner 460 may backpropagate the loss to elements of the model, the elements including, without limitation, one or more of the item-user association predictor 450, the selector 440, the usage data simulator 430 (e.g., one or more of the content-usage correlator 432, the content-usage shift vector 433, and the shifter 434), elements used to process the content data 412 (e.g., one or more of the content element analyzers 420, concatenator 422, and the aggregate content analyzer 424), other elements used to vectorize the input data (e.g., to vectorize the usage data 414 and/or the user data 416), and vectorized representations of the input data (e.g., vectorized forms of one or more of the content data 412, usage data 414, and user data 416). The labeled input data may include data for several items and users, and the model may be trained over any number of iterations and/or epochs to yield a trained version of model 404.

In implementations, the trained version of model 404 may be configured to receive input data regarding cold items. The selector 440 may be modified to only select simulated usage data, as the cold item may not have usage data 414 to input into the model 404. In this implementation, the item-user association predictor 450 may exclusively take the simulated usage data as input to make the prediction 406. This simulated usage data may be used to compensate for a lack of usage data for cold items. In this way, cold items can be harmonized with warm items, as the simulated usage data is based on an inferred relationship between warm usage data and warm content data via the usage data simulator 430. In this way, cold data representations can be harmonized with warm data representations used to train the model 404, and associations can be predicted for cold items in harmony with the associations established for warm items.

Figure 5:
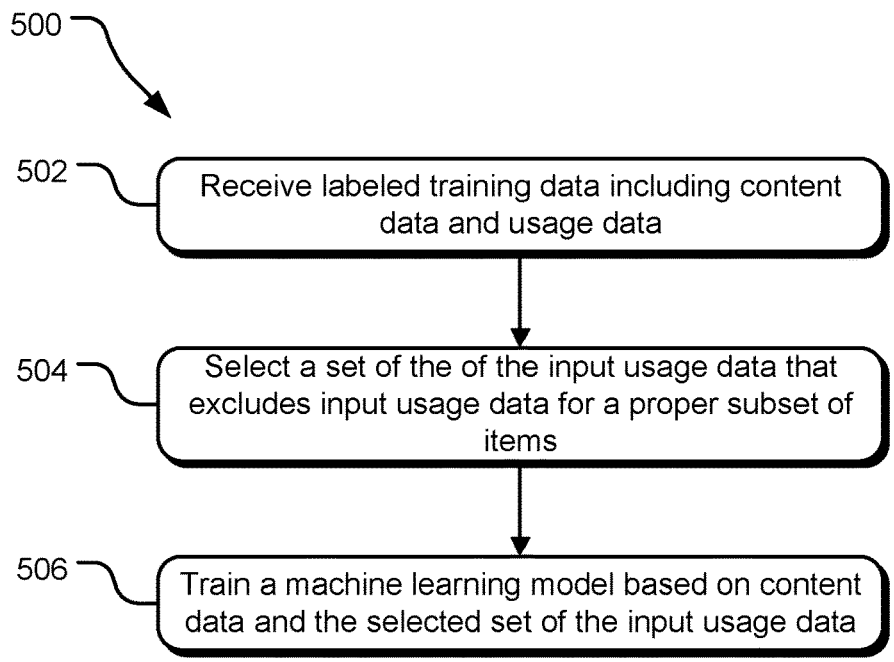
FIG. 5 illustrates example operations for training an inferential model.

FIG. 5 illustrates example operations 500 for training an inferential model. Receiving operation 502 receives labeled training data including at least content data and usage data. In implementations, the received data may further include user data that identifies a user. The label of the labeled input data may represent a known association between a user and an item. The machine learning model may modify the input data, such as by reformatting or vectorizing the input data. The usage data may be vectorized in the model to be presented as vectorized usage data with individual usage vectors. Similarly, the user data may be vectorized in the model to be presented as vectorized user data with individual user vectors. Implementations are contemplated in which the model is trained without user data 416 input, such that vectorized user data may be omitted. In implementations, the received labeled data for training is warm item data.

The content data may include multiple content elements (e.g., text descriptions, titles, identifiers, product codes, identifiers, etc.) for each item. Each element of content may be analyzed by a content element analyzer specific to the type of content element to yield a content element representation. The content element representations may be concatenated by a concatenator to yield a concatenated content vector. The concatenated content vector may then be provided to an aggregate content analyzer to output an aggregated content vector. The aggregated content vector may be provided as input to an item-user association predictor.

Training operation 504 trains a machine learning model based on the received labeled training data. In implementations that use a selector to select between input usage data (e.g., vectorized usage data) and simulated usage data provided by a usage data simulator to provide as input to the item-user association predictor, the concatenated content vector may also be provided to a content-usage correlator that correlates usage and content to output raw simulated usage data. The raw simulated usage data may be provided to a shifter of the usage data simulator to be shifted by a content-usage shift vector of the usage data simulator. In an implementation, the shifter shifts by summing the shift vector with the raw simulated usage data. The shifter outputs simulated usage data.

In implementations in which training the model involves selecting by a selector between an input usage data vector and simulated usage data, the selector may select which of the input usage data vector and simulated usage data is introduced to the item-user association predictor for generating a prediction. The selection of whether to use input usage data or simulated usage data in the training may be based on a random variable with a predefined and/or modifiable probability distribution. For example, the random variable may be a Bernoulli random variable. The random variable may be based on one or more modifiable parameters. The one or more modifiable parameters may be tuned in a predefined fashion to compensate for a bias towards warm or popular items for which adequate usage data is provided (by comparison with limited or no usage data associated with cold items).

In the aggregate (e.g., within an iteration or epoch of training), the selector may select a set of the input usage data that excludes input usage data for a proper subset of the items. A proper subset is a subset that does not include all elements of a set to which the subset belongs. Data representing the proper subset of items selected may include a proper subset of usage data that may be selectively excluded from data input. The usage data simulator of the model may simulate usage data based on the content data for the proper subset of the items, and the simulated usage data may be used in lieu of input usage data for that proper subset.

The item-user association predictor receives inputs including one or more of user data (e.g., user data vector of usage data vectors), usage data (e.g., a usage data vector in implementations without a selector or a selected one of input usage data or simulated usage data in implementations with a selector), and content data (e.g., an aggregated content vector).

The item-user association predictor outputs a prediction regarding an association between an item and a user. The prediction may include a probability that the particular association is true for the item and the user (e.g., a user is likely to purchase an item, a user is likely to consume an item, a user is likely to recommend an item, a user is likely to ignore an item, a user is likely to subscribe to a service to get the item, etc.). The model may have an activation layer that presents the output as a discrete value. For example, a minus one may represent that an association is unlikely, and a positive one may represent that an association is likely. Because the input data is labeled, the model tuner can take the prediction, compare it with the label (e.g., a ground-truth value for the association), and determine a loss based on the difference between the prediction and the label. The model tuner may backpropagate the loss to elements of the model, the elements including, without limitation, one or more of the item-user association predictor, the selector, the usage data simulator (e.g., the content-usage correlator, the content-usage shift vector, and the shifter), elements used to process the content data (e.g., one or more of the content element analyzers, concatenator, and the aggregate content analyzer), other elements used to vectorize the input data (e.g., to vectorize the usage data and/or the user data), and vectorized representations of the input data (e.g., vectorized forms of one or more of the content data, usage data, and user data). The input data may include data for several pieces of content and users, and the model may be trained over any number of iterations and/or epochs to yield a trained version of the model.

Figure 6:
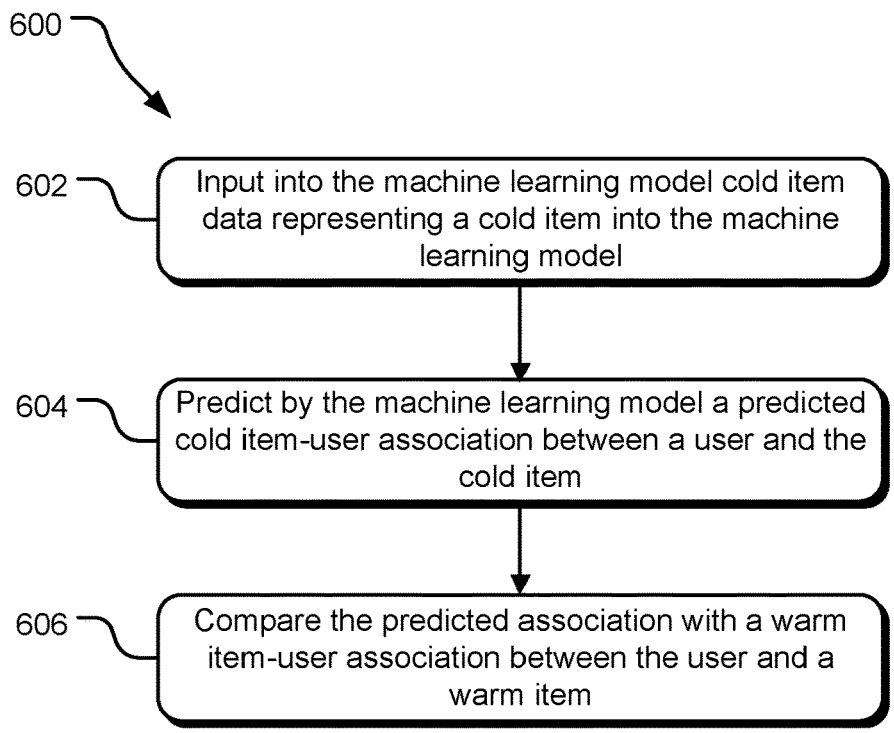
FIG. 6 illustrates example operations for using a trained machine learning model.

FIG. 6 illustrates example operations 600 for using a trained machine learning model. Inputting operation 602 inputs cold item content data into the machine learning model. Cold items are ones for which there is no usage data (e.g., data representing a new product or service) or for which the amount or nature of the usage data fails to satisfy a warm item condition. The warm item condition may include a threshold of one or more of consumption, purchase, indication of interest, engagement, or other association between a user and the item. Warm items, in contrast to cold items, have sufficient associated usage data to satisfy a warm item condition.

Outputting operation 604 outputs from the trained machine learning model an enhanced prediction of an association between a user and the cold item. Because the cold item has little to no representative usage data, the machine learning model may rely on simulated usage data (e.g., data produced by a usage data simulator) to determine the cold item-user association between the user and the cold item. A selector of the machine learning model may be modified to only select simulated usage data as input to determine a user-content association (as opposed to absent or deficient actual usage data available for the cold data). In this implementation, the item-user association predictor may exclusively take the simulated usage data as input to generate an enhanced prediction of a cold item-user association between the user and the cold item.

Comparing operation 606 compares the outputted predicted cold item-user association with a warm item-user association between the user and a warm item. The output of the model from the cold content data input can be directly compared with the output for the existing warm data. The simulated usage data may be used to compensate for a lack of usage data for cold items. In this way, cold item-user associations can be harmonized with warm item-user associations, as the simulated usage data is based on an inferred relationship between warm usage data and warm content data via the usage data simulator. For example, in a recommender system, the output of the machine learning model from cold item data can be compared with the warm item output established during training with the warm item data. This can help prioritize or rank the cold items relative to the warm items for any particular user. For example, in a list of movie recommendations, a new movie that has never been seen can be ranked against a movie that is very popular and for which rich usage data is available.

Figure 7:
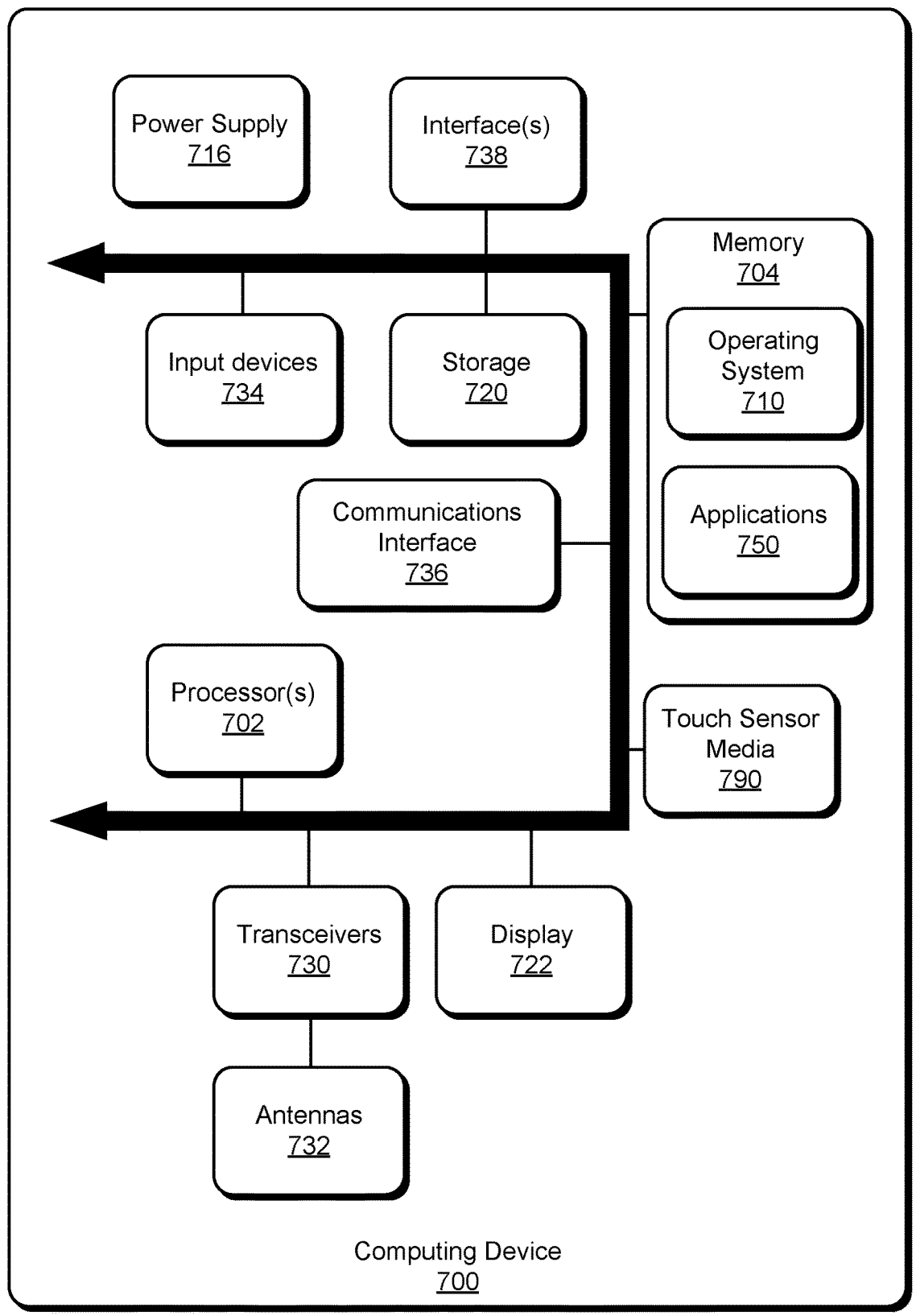
FIG. 7 illustrates an example computing device for implementing the features and operations of the described technology.

FIG. 7 illustrates an example computing device 700 for implementing the features and operations of the described technology. The computing device 700 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702.

In an example computing device 700, as shown in FIG. 7, one or more modules or segments, such as applications 750, content element analyzers, concatenators, aggregate content analyzers, usage data simulators, content-usage correlators, shifters, selectors, item-user association predictors, functions, content element-specific analyzer functions, machine learning models, inferential models, and model tuners are loaded into the operating system 710 on the memory 704 and/or storage 720 and executed by processor(s) 702. The storage 720 may include one or more tangible storage media devices and may store labeled data, input data, predictions, labels, ground truth values, content data, usage data, user data, item-user associations, rankings, content elements, content element representations, concatenated content vectors, random variables, probability distributions, modifiable popularity bias correction parameters, aggregate content vectors, raw simulated usage data, shifted raw simulated usage data, usage data vectors, user data vectors, simulated usage data, content-usage shift vectors, CB representations, CF representations, affinities, machine learning models, neural networks, inferential models, sets of input usage data that excludes input usage data for a proper subset of items, a proper subset of items, locally and globally unique identifiers, requests, responses, and other data and be local to the computing device 700 or may be remote and communicatively connected to the computing device 700.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a communications interface 736 (e.g., a network adapter), which is a type of computing device. The computing device 700 may use the communications interface 736 and any other types of computing devices for establishing connections over a wide-area network (WAN) or local-area network (LAN). It should be appreciated that the network connections shown are examples and that other computing devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method of training a machine learning model is provided. The method includes receiving labeled training data in the machine learning model, the received labeled training data including content data for items accessible to a user and input usage data representing recorded interaction between the user and the items, wherein the content data for each item includes data representing intrinsic attributes of the item, selecting a set of the input usage data that excludes input usage data for a proper subset of the items, and training the machine learning model based on both the content data and the selected set of the input usage data of the received labeled training data for the items.

Another example method of any preceding method is provided. The method includes simulating, by a usage data simulator of the machine learning model, simulated usage data, based on the content data for the proper subset of the items, wherein the operation of training further trains the machine learning model based on the simulated usage data for the proper subset of the items.

Another example method of any preceding method is provided, wherein the operation of selecting selects the set of the input usage data based on a random variable.

Another example method of any preceding method is provided, wherein the random variable is based on a modifiable popularity bias compensation parameter.

Another example method of any preceding method is provided, the method including generating, by an aggregate content analyzer of the machine learning model, an aggregated content data representation based on a plurality of content elements of the content data, wherein the operation of training is based on the aggregated content data representation.

Another example method of any preceding method is provided, wherein the operation of training further includes determining a loss between a label of the labeled training data and a prediction output by the machine learning model and modifying the labeled training data based on the determined loss.

Another example method of any preceding method is provided, wherein the labeled training data further includes user data that identifies the user.

An example computing device is provided. The computing device incudes a processor and memory, the processor configured to execute instructions stored in the memory. The computing device further includes a communication interface operable to receive labeled training data in a machine learning model, the received labeled training data including content data for items accessible to a user and input usage data representing recorded interaction between the user and the items, wherein the content data for each item includes data representing intrinsic attributes of the item, a selector executable by the processor and operable to select a set of the input usage data that excludes input usage data for a proper subset of the items, and a model tuner executable by the processor and operable to train the machine learning model based on both the content data and the selected set of the input usage data of the received labeled training data for the items.

Another example computing system of any preceding computing system is provided. The computing system includes a usage data simulator of the machine learning model executable by the processor and operable to simulate simulated usage data, based on the content data for the proper subset of the items, wherein the model tuner trains the machine learning model further based on the simulated usage data for the proper subset of the items.

Another example computing system of any preceding computing system is provided, wherein the selector selects the set of the input usage data based on a random variable.

Another example computing system of any preceding computing system is provided, wherein the random variable is based on a modifiable popularity bias compensation parameter.

Another example computing system of any preceding computing system is provided further including an aggregate content analyzer of the machine learning model executable by the processor and operable to generate an aggregated content data representation based on a plurality of content elements of the content data, wherein the model tuner trains further based on the aggregated content data representation.

Another example computing system of any preceding computing system is provided, wherein the model tuner is operable to determine a loss between a label of the labeled training data and a prediction output by the machine learning model and modify the labeled training data based on the determined loss.

Another example computing system of any preceding computing system is provided, wherein the labeled training data further includes user data that identifies the user.

One or more example tangible processor-readable storage media embodied with instructions for executing on one or more processors of a computing device a process for training a machine learning model is provided. The process includes receiving labeled training data in the machine learning model, the received labeled training data including content data for items accessible to a user and input usage data representing recorded interaction between the user and the items, wherein the content data for each item includes data representing intrinsic attributes of the item, selecting a set of the input usage data that excludes input usage data for a proper subset of the items, and training the machine learning model based on both the content data and the selected set of the input usage data of the received labeled training data for the items.

One or more other example tangible processor-readable storage media of any preceding media is provided, the process further including simulating, by a usage data simulator of the machine learning model, simulated usage data, based on the content data for the proper subset of the items, wherein the operation of training further trains the machine learning model based on the simulated usage data for the proper subset of the items.

One or more other example tangible processor-readable storage media of any preceding media is provided, wherein the operation of selecting selects the set of the input usage data based on a random variable.

One or more other example tangible processor-readable storage media of any preceding media is provided, wherein the random variable is based on a modifiable popularity bias compensation parameter.

One or more other example tangible processor-readable storage media of any preceding media is provided, the process further including generating, by an aggregate content analyzer of the machine learning model, an aggregated content data representation based on a plurality of content elements of the content data, wherein the operation of training is based on the aggregated content data representation.

One or more other example tangible processor-readable storage media of any preceding media is provided, wherein the training further includes determining a loss between a label of the labeled training data and a prediction output by the machine learning model and modifying the labeled training data based on the determined loss.

An example system of training a machine learning model is provided. The system includes means for receiving labeled training data in the machine learning model, the received labeled training data including content data for items accessible to a user and input usage data representing recorded interaction between the user and the items, wherein the content data for each item includes data representing intrinsic attributes of the item, means for selecting a set of the input usage data that excludes input usage data for a proper subset of the items, and means for training the machine learning model based on both the content data and the selected set of the input usage data of the received labeled training data for the items.

Another example system of any preceding system is provided. The system includes means for simulating, by a usage data simulator of the machine learning model, simulated usage data, based on the content data for the proper subset of the items, wherein the means for training further trains the machine learning model based on the simulated usage data for the proper subset of the items.

Another example system of any preceding system is provided, wherein the means for selecting selects the set of the input usage data based on a random variable.

Another example system of any preceding system is provided, wherein the random variable is based on a modifiable popularity bias compensation parameter.

Another example system of any preceding system is provided, the system including means for generating, by an aggregate content analyzer of the machine learning model, an aggregated content data representation based on a plurality of content elements of the content data, wherein the training is based on the aggregated content data representation.

Another example system of any preceding system is provided, wherein the means for training further include means for determining a loss between a label of the labeled training data and a prediction output by the machine learning model and means for modifying the labeled training data based on the determined loss.

Another example system of any preceding system is provided, wherein the labeled training data further includes user data that identifies the user.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of training a machine learning model, the method comprising:
   receiving training data in the machine learning model, the received training data including content data for one or more items accessible to one or more users and input usage data labels representing recorded interaction between each user and each item, wherein the content data for each item includes data representing intrinsic attributes of the item;

generating modified training data by including the content data and the input usage data labels for a second proper subset of items and the input usage data labels for the first proper subset of the items and by excluding the input usage data labels for the first proper subset of the items, the second proper subset of the items corresponding to the items not included in the first proper subset;

simulating, by a usage data simulator of the machine learning model and for the first proper subset of items, simulated usage data labels, based on the content data for the first proper subset of the items;

adding the simulated usage data labels to the modified training data; and training the machine learning model using the modified training data to predict input usage data of an input item based on input content data of the input item.

2. The method of claim 1, wherein the operation of training further trains the machine learning model based on the simulated usage data labels for the first proper subset of the items.

3. The method of claim 1, wherein the operation of generating excludes the input usage data labels for the first proper subset of the items based on a random variable.

4. The method of claim 3, wherein the random variable is based on a modifiable popularity bias compensation parameter.

5. The method of claim 1, further comprising:
generating, by an aggregate content analyzer of the machine learning model, an aggregated content data representation based on a plurality of content elements of the content data, wherein the operation of training is based on the aggregated content data representation.

6. The method of claim 1, wherein the operation of training further comprises:
determining a loss between an excluded usage data label of the training data for a given item of the first proper subset of the items and a predicted usage data label output by the machine learning model for the given item of the first proper subset of the items; and
modifying the modified training data based on the determined loss.

7. The method of claim 1, wherein the training data further includes user data that identifies the user.

8. A computing device having a processor and memory, the processor configured to execute instructions stored in the memory, the computing device comprising:
a communication interface operable to receive training data in a machine learning model, the received training data including content data for items accessible to a user and input usage data labels representing recorded interaction between the user and the items, wherein the content data for each item includes data representing intrinsic attributes of the item;
a selector executable by the processor and operable to generate modified training data by excluding, from the training data, the input usage data labels for a first proper subset of the items of the received training data, the modified training data including the input usage data labels for a second proper subset of the items and the content data for the first proper subset of the items and the second proper subset of the items, the second proper subset of the items corresponding to the items not included in the first proper subset;
a usage data simulator of the machine learning model executable by the processor and operable to:

simulate, for the first proper subset of the items, simulated usage data labels, based on the content data for the first proper subset of the items; and
add the simulated usage data labels to the modified training data; and
a model tuner executable by the processor and operable to train, using the modified training data, the machine learning model to predict input usage data of input items based on content data of the input items.

9. The computing device of claim 8, wherein the model tuner trains the machine learning model further based on the simulated usage data labels for the first proper subset of the items.

10. The computing device of claim 9, wherein the selector excludes the input usage data labels for the first proper subset of the items based on a random variable.

11. The computing device of claim 10, wherein the random variable is based on a modifiable popularity bias compensation parameter.

12. The computing device of claim 8, further comprising:
an aggregate content analyzer of the machine learning model executable by the processor and operable to generate an aggregated content data representation based on a plurality of content elements of the content data, wherein the model tuner trains further based on the aggregated content data representation.

13. The computing device of claim 8, wherein the model tuner is operable to:
determine a loss between an excluded usage data label of the training data for a given item of the first proper subset of the items and a predicted usage data label output by the machine learning model for the given item of the first proper subset of the items; and
modify the modified training data based on the determined loss.

14. The computing device of claim 8, wherein the training data further includes user data that identifies the user.

15. One or more tangible processor-readable storage media embodied with instructions for executing on one or more processors of a computing device a process for training a machine learning model, the process comprising:
receiving training data in the machine learning model, the received training data including content data for items accessible to a user and input usage data labels representing recorded interaction between the user and the items, wherein the content data for each item includes data representing intrinsic attributes of the item;
generating modified training data by excluding, from the training data, the input usage data labels for a first proper subset of the items of the training data, the modified training data including the input usage data labels for a second proper subset of the items and the content data for the first proper subset of the items and the second proper subset of the items, the second proper subset of the items corresponding to the items not included in the first proper subset;
simulating, by a usage data simulator of the machine learning model and for the first proper subset of the items, simulated usage data labels, based on the content data for the first proper subset of the items;
adding the simulated usage data labels to the modified training data; and
training the machine learning model to predict input usage data of input items based on content data of the input items, the training operation using the modified training data.

16. The one or more tangible processor-readable storage media of claim 15, wherein the operation of training further trains the machine learning model based on the simulated usage data labels for the first proper subset of the items.

17. The one or more tangible processor-readable storage media of claim 16, wherein the operation of generating excludes the input usage data labels for the first proper subset of the items based on a random variable.

18. The one or more tangible processor-readable storage media of claim 17, wherein the random variable is based on a modifiable popularity bias compensation parameter.

19. The one or more tangible processor-readable storage media of claim 15, the process further comprising:
generating, by an aggregate content analyzer of the machine learning model, an aggregated content data representation based on a plurality of content elements of the content data, wherein the operation of training is based on the aggregated content data representation.

20. The one or more tangible processor-readable storage media of claim 15, wherein the training further comprises:
determining a loss between an excluded usage data label of the training data for a given item of the first proper subset of the items and a predicted usage data label output by the machine learning model for the given item of the first proper subset of the items; and
modifying the modified training data based on the determined loss.

* * * * *